US011121361B2

(12) United States Patent
Ahn et al.

(10) Patent No.: US 11,121,361 B2
(45) Date of Patent: Sep. 14, 2021

(54) METHOD OF PREPARING SLURRY FOR SECONDARY BATTERY POSITIVE ELECTRODE

(71) Applicant: LG Chem, Ltd., Seoul (KR)

(72) Inventors: Byoung Hoon Ahn, Daejeon (KR); Sang Hoon Choy, Daejeon (KR); Chang Wan Koo, Daejeon (KR); Hyun Chul Ha, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/339,598

(22) PCT Filed: Mar. 21, 2018

(86) PCT No.: PCT/KR2018/003257
§ 371 (c)(1),
(2) Date: Apr. 4, 2019

(87) PCT Pub. No.: WO2018/174538
PCT Pub. Date: Sep. 27, 2018

(65) Prior Publication Data
US 2020/0044238 A1   Feb. 6, 2020

(30) Foreign Application Priority Data
Mar. 23, 2017 (KR) .......... 10-2017-0037052
Mar. 19, 2018 (KR) .......... 10-2018-0031616

(51) Int. Cl.
*H01M 4/1397* (2010.01)
*H01M 4/36* (2006.01)
(Continued)

(52) U.S. Cl.
CPC .......... *H01M 4/1397* (2013.01); *H01M 4/364* (2013.01); *H01M 4/622* (2013.01); *H01M 10/0525* (2013.01)

(58) Field of Classification Search
CPC .... H01M 4/364; H01M 4/1397; H01M 4/622; H01M 10/0525
See application file for complete search history.

(56) References Cited

U.S. PATENT DOCUMENTS

2003/0073000 A1   4/2003   Lee et al.
2008/0096109 A1*  4/2008   Fukumine ............. H01M 4/364
                                                          429/212

(Continued)

FOREIGN PATENT DOCUMENTS

| CN | 1588679 A | 3/2005 |
| CN | 1260838 C | 6/2006 |

(Continued)

OTHER PUBLICATIONS

Extended European Search Report for Application No. 18770327.7 dated Jul. 17, 2019, 9 pages.

(Continued)

*Primary Examiner* — Osei K Amponsah
(74) *Attorney, Agent, or Firm* — Lerner, David, Littenberg, Krumholz & Mentlik, LLP

(57) ABSTRACT

The present invention provides a method of preparing a slurry for a secondary battery positive electrode which includes forming a first mixture in a paste state by adding a lithium iron phosphate-based positive electrode active material, a conductive agent, a binder, and a solvent, and preparing a slurry for a positive electrode by mixing while further adding a solvent to the first mixture in the paste state.

8 Claims, 2 Drawing Sheets

(51) Int. Cl.
  *H01M 10/0525* (2010.01)
  *H01M 4/62* (2006.01)

(56) References Cited

U.S. PATENT DOCUMENTS

| | | |
|---|---|---|
| 2009/0263718 A1 | 10/2009 | Higashizaki et al. |
| 2009/0317718 A1 | 12/2009 | Imachi et al. |
| 2013/0156942 A1 | 6/2013 | Yamakaji et al. |
| 2013/0337319 A1* | 12/2013 | Doherty .............. H01M 4/1397 429/209 |
| 2014/0295276 A1 | 10/2014 | Takami et al. |
| 2015/0083976 A1 | 3/2015 | Rao et al. |
| 2018/0226650 A1 | 8/2018 | Yoo et al. |

FOREIGN PATENT DOCUMENTS

| | | |
|---|---|---|
| CN | 101383441 A | 3/2009 |
| JP | 2005-251554 A | 9/2005 |
| JP | 2009064564 A | 3/2009 |
| JP | 2009187819 A | 8/2009 |
| JP | 2009266400 A | 11/2009 |
| JP | 2013008485 A | 1/2013 |
| JP | 2014209463 A | 11/2014 |
| JP | 2015153529 A | 8/2015 |
| KR | 0808912 B | 3/2008 |
| KR | 1245064 B1 | 3/2013 |
| KR | 20150016852 A | 2/2015 |
| KR | 20150033536 A | 4/2015 |
| KR | 20150037071 A | 4/2015 |
| WO | 2017043818 A1 | 3/2017 |
| WO | 2017099358 A1 | 6/2017 |
| WO | 2017164701 A1 | 9/2017 |

OTHER PUBLICATIONS

International Search Report for PCT/KR2018/003257, dated Jul. 2, 2018.
Search Report from Office Action for Chinese Application No. 201880003933.2 dated Jul. 2, 2021; 2 pages.

\* cited by examiner

METHOD OF PREPARING SLURRY FOR SECONDARY BATTERY POSITIVE ELECTRODE

CROSS-REFERENCE TO RELATED APPLICATIONS

This application is a national phase entry under 35 U.S.C. § 371 of International Application No. PCT/KR2018/003257, filed Mar. 21, 2018, which claims priority to Korean Patent Application Nos. 10-2017-0037052, filed on Mar. 23, 2017, and Korean Patent Application No. 10-2018-0031616, filed on Mar. 19, 2018, the disclosures of which are incorporated herein in their entirety by reference.

TECHNICAL FIELD

The present invention relates to a method of preparing a slurry for a secondary battery positive electrode.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

A lithium-containing cobalt oxide ($LiCoO_2$) having a high operating voltage and excellent capacity characteristics has been used as a main component of a positive electrode active material of a conventional lithium secondary battery, wherein, since the lithium-containing cobalt oxide has very poor thermal properties due to an unstable crystal structure caused by lithium deintercalation and is expensive, there is a limitation in that mass production of the lithium secondary battery is difficult.

Recently, a lithium iron phosphate-based ($LiFePO_4$) compound, which not only has better high-temperature stability than cobalt, but is also inexpensive while having a voltage of ~3.5 V vs. lithium, a high bulk density of about 3.6 g/cm$^3$, and a theoretical capacity of about 170 mAh/g, is in the spotlight as a positive electrode active material of a lithium secondary battery.

The lithium iron phosphate-based positive electrode active material is a structurally very stable positive electrode active material, but is disadvantageous in that electrical conductivity and ionic conductivity are low. Thus, the lithium iron phosphate-based positive electrode active material is used in such a manner that the electrical conductivity is improved by coating the surface of the lithium iron phosphate-based positive electrode active material with carbon, and the ionic conductivity is improved by reducing a particle size of the lithium iron phosphate-based positive electrode active material.

However, since a specific surface area was increased and agglomeration of positive electrode active material particles severely occurred as the particle size of the positive electrode active material was reduced, there were limitations in that dispersion was difficult.

DISCLOSURE OF THE INVENTION

Technical Problem

An aspect of the present invention provides a method of preparing a slurry for a secondary battery positive electrode which may suppress agglomeration of a lithium iron phosphate-based positive electrode active material with a reduced particle size and may improve dispersibility.

Technical Solution

According to an aspect of the present invention, there is provided a method of preparing a slurry for a secondary battery positive electrode which includes forming a first mixture in a paste state by adding a lithium iron phosphate-based positive electrode active material, a conductive agent, a binder, and a solvent; and preparing a slurry for a positive electrode by mixing while further adding a solvent to the first mixture in the paste state.

Advantageous Effects

According to the present invention, a dispersion particle size may be reduced by suppressing agglomeration of a lithium iron phosphate-based positive electrode active material with a reduced particle size and improving dispersibility, and a positive electrode, which is prepared by being coated with a positive electrode slurry according to the present invention, may be uniformly coated without the formation of grains on the surface thereof.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
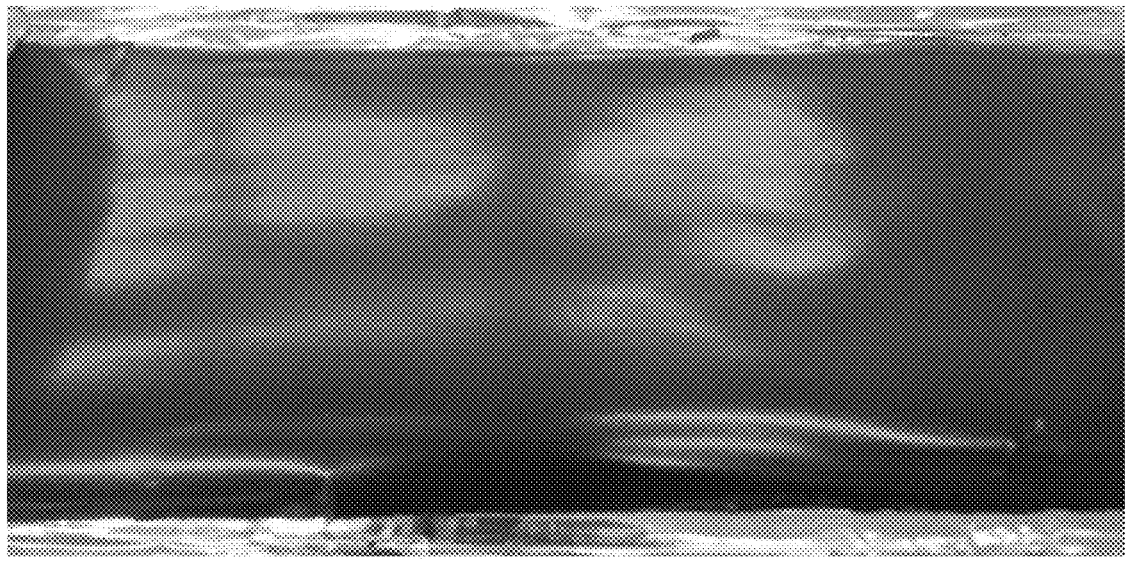
FIG. 1 is an image of a surface of a positive electrode prepared with a slurry for a positive electrode according to Example 1.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A method of preparing a slurry composition for a secondary battery positive electrode of the present invention includes: forming a first mixture in a paste state by adding a lithium iron phosphate-based positive electrode active material, a conductive agent, a binder, and a solvent; and preparing a slurry for a positive electrode by mixing while further adding a solvent to the first mixture in the paste state.

The lithium iron phosphate-based positive electrode active material is a structurally very stable positive electrode active material, but is disadvantageous in that electrical conductivity and ionic conductivity are low. Thus, the lithium iron phosphate-based positive electrode active material is used in such a manner that the electrical conductivity is improved by coating the surface of the lithium iron phosphate-based positive electrode active material with carbon, and the ionic conductivity is improved by reducing a particle size of the lithium iron phosphate-based positive electrode active material.

Typically, since agglomeration of positive electrode active material particles severely occurred as the particle size of the lithium iron phosphate-based positive electrode active material was reduced, dispersion was difficult.

Thus, in the present invention, since a first mixture in a paste state is prepared by mixing a lithium iron phosphate-based positive electrode active material, a conductive agent, a binder, and a solvent, and a slurry for a positive electrode is prepared by mixing while further adding a solvent to the first mixture in the paste state, the dispersibility issues of the lithium iron phosphate-based positive electrode active material with a reduced particle size are addressed. If the mixing is performed while further adding the solvent to the first mixture in the paste state, since shear stress (proportional to shear rate and shear viscosity) applied in the mixing process may be efficiently transferred, dispersibility may be improved even for the lithium iron phosphate-based positive electrode active material having an increased specific surface area due to a reduction in particle size.

The first mixture in the paste state may be formed by adjusting a solid content ratio. Specifically, the first mixture may have a solid content of 50 wt % to 75 wt %, more preferably 60 wt % to 70 wt %, and most preferably 65 wt % to 70 wt %. In a case in which the solid content of the first mixture is less than 50 wt %, the mixture becomes a liquid form with low viscosity, wherein, in this case, although an effect of increasing the shear rate may be sufficiently obtained during the mixing process, since the shear viscosity is low, there is a limitation in improving the shear stress, and thus, the dispersibility may be reduced. In a case in which the solid content of the first mixture is greater than wt %, the mixture forms an agglomerate with very high viscosity, wherein, in this case, although shear viscosity is very high, since the effect of increasing the shear rate obtained during mixing process is reduced, the dispersibility may be reduced. Thus, since the mixing is started in a state in which a paste is formed by adjusting the solid content of the first mixture within the range of the present invention, the shear stress may be efficiently transferred and the dispersibility may be significantly improved.

Specifically, the first mixture may have a shear viscosity at a shear rate of $10^{-1}$/s of 1,000 Pa·s to 5,000 Pa·s (23° C.), and, also, the first mixture may have a shear viscosity at a shear rate of 1/s of 100 Pa·s to 500 Pa·s (23° C.). Furthermore, the first mixture may have a shear viscosity at a shear rate of $10^{-1}$/s of 2,000 Pa·s to 3,000 Pa·s (23° C.), and may have a shear viscosity at a shear rate of 1/s of 200 Pa·s to 300 Pa·s (23° C.)

The lithium iron phosphate-based positive electrode active material may be represented by the following Formula 1.

$$Li_{1+a}Fe_{1-x}M_xPO_{4-b}A_b \quad \text{[Formula 9]}$$

In Formula 1, M is at least one selected from the group consisting of manganese (Mn), nickel (Ni), cobalt (Co), copper (Cu), scandium (Sc), titanium (Ti), chromium (Cr), vanadium (V), and zinc (Zn), A is at least one selected from the group consisting of sulfur (S), selenium (Se), fluorine (F), chlorine (Cl), and iodine (I), −0.5<a<0.5, 0≤x<0.5, and 0≤b≤0.1.

For example, the lithium iron phosphate-based positive electrode active material may be $LiFePO_4$. Also, in order to improve the electrical conductivity of the lithium iron phosphate-based positive electrode active material, the surface of the particle may be coated with a carbon-based material.

The lithium iron phosphate-based positive electrode active material may be a primary particle having an average particle diameter ($D_{50}$) of less than 1 μm, more preferably less than 0.9 μm, and most preferably less than 0.8 μm. Typically, since the lithium iron phosphate-based positive electrode active material having an average particle diameter ($D_{50}$) of less than 1 μm had a large specific surface area, agglomeration severely occurred and dispersion was difficult, but, in the present invention, the shear stress may be efficiently transferred by mixing the mixture in the paste state, and thus, the dispersibility may be improved.

The conductive agent is used to provide conductivity to the electrode, wherein any conductive agent may be used without particular limitation as long as it has electrical conductivity without causing adverse chemical changes in the battery. Specific examples of the conductive agent may be at least one selected from the group consisting of graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives. The conductive agent may be included in an amount of 1 wt % to 30 wt % based on a total weight of the slurry for a positive electrode.

The binder improves the adhesion between the positive electrode active material particles and the adhesion between the positive electrode active material and a current collector. Specific examples of the binder may be at least one selected from the group consisting of polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated-EPDM, a styrene-butadiene rubber (SBR), and a fluorine rubber, or copolymers thereof. The binder may be included in an amount of 1 wt % to 30 wt % based on the total weight of the slurry for a positive electrode.

A solvent normally used in the art may be used as the solvent, and the solvent may include dimethyl sulfoxide (DMSO), isopropyl alcohol, N-methylpyrrolidone (NMP), acetone, or water, and any one thereof or a mixture of two or more thereof may be used, for example, N-methylpyrrolidone (NMP) may be used.

A dispersant may be further added during the formation of the first mixture. A commonly used dispersant may be used as the dispersant, but a hydrogenated nitrile butadiene rubber (HNBR) may be more preferably used, although it is not necessary limited thereto.

The hydrogenated nitrile butadiene rubber (HNBR) denotes one in which a double bond originally included in a nitrile butadiene rubber (NBR) becomes a single bond by hydrogenation of the nitrile butadiene rubber (NBR).

The hydrogenated nitrile butadiene rubber (HNBR) dispersant includes a repeating unit derived from acrylonitrile (AN) in an amount of 20 wt % to 50 wt %, more preferably 25 wt % to 45 wt %, and most preferably 30 wt % to 40 wt % based on a total weight of the hydrogenated nitrile butadiene rubber (HNBR).

A hydrogenated butadiene (HBD) ratio in the hydrogenated nitrile butadiene rubber (HNBR) dispersant may satisfy the following Equation 1.

$$1(\%) \leq \text{HBD wt \%}/(\text{BD}+\text{HBD}) \text{ wt \%} \times 100 \leq 30(\%) \quad \text{[Equation 1]}$$

In Equation 1, HBD wt % is weight % of a hydrogenated butadiene (HBD)-derived repeating unit based on a total weight of the hydrogenated nitrile butadiene rubber (HNBR), and (BD+HBD) wt % is weight % of a butadiene (BD)-derived repeating unit and the hydrogenated butadiene (HBD)-derived repeating unit based on the total weight of the hydrogenated nitrile butadiene rubber (HNBR).

The hydrogenated butadiene (HBD) ratio of Equation 1 may be more preferably in a range of 5% to 25%, and may be most preferably in a range of 10% to 25%.

In a case in which the hydrogenated butadiene (HBD) ratio of Equation 1 is less than 1%, since adhesion to a surface of a carbon coating coated on a surface of the positive electrode active material is reduced, wetting is not well performed during the preparation of a dispersion, and thus, dispersibility may be reduced. In a case in which the hydrogenated butadiene (HBD) ratio is greater than 30%, solubility of the hydrogenated nitrile butadiene rubber in a dispersion medium may be reduced.

The hydrogenated nitrile butadiene rubber (HNBR) dispersant may have a weight-average molecular weight (MW) of 10,000 to 700,000, more preferably 25,000 to 600,000, and most preferably 300,000 to 500,000.

The dispersant may be included in an amount of 0.8 part by weight to 1.5 parts by weight, more preferably 0.8 part by weight to 1.3 parts by weight, and most preferably 1 part by weight to 1.2 parts by weight based on 100 parts by weight of the lithium iron phosphate-based positive electrode active material.

The mixing may be performed according to a conventional mixing method and, for example, may be performed by using a mixing device such as a homogenizer, a bead mill, a ball mill, a basket mill, an attrition mill, a universal stirrer, a clear mixer, or a TK mixer.

Thus, since the mixing is performed on the mixture in the paste state, which includes the lithium iron phosphate-based positive electrode active material, the conductive agent, the binder, and the solvent, according to an embodiment of the present invention, the dispersibility of the lithium iron phosphate-based positive electrode active material may be improved and a positive electrode, which is prepared by being coated with the above-described slurry for a positive electrode, may be uniformly coated without the formation of grains on the surface thereof.

A positive electrode for a secondary battery may be prepared by using the above-described slurry composition for a secondary battery positive electrode.

Specifically, the positive electrode includes a positive electrode collector and a positive electrode active material layer which is disposed on at least one surface of the positive electrode collector and is formed by using the above-described slurry composition for a positive electrode.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode may be prepared according to a typical method of preparing a positive electrode except that the above-described slurry composition for a positive electrode is used. Specifically, the above-described slurry composition for a positive electrode is coated on the positive electrode collector, and the positive electrode may then be prepared by drying and rolling the coated positive electrode collector.

Also, as another method, the positive electrode may be prepared by casting the above-described slurry composition for a positive electrode on a separate support and then laminating a film separated from the support on the positive electrode collector.

Furthermore, according to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

The negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be preferably used, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be more preferably used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLE 1

$LiFePO_4$ having an average particle diameter ($D_{50}$) of 1.2 μm as a positive electrode active material, carbon black as a conductive agent, and PVDF, as a binder, were mixed in a weight ratio of 93:3:4 in an N-methylpyrrolidone solvent at 3,000 rpm for 60 minutes using a Homo mixer (Homodisper) to prepare a first mixture. In this case, a solid content of the first mixture was 68 wt %. While further adding an N-methylpyrrolidone solvent to the first mixture in a paste state thus prepared, mixing was performed at 3,000 rpm for 20 minutes using a Homo mixer to prepare a slurry (solid content of 48 wt %) for a positive electrode.

EXAMPLE 2

A slurry (solid content of 48 wt %) for a positive electrode was prepared in the same manner as in Example 1 except that $LiFePO_4$ having an average particle diameter ($D_{50}$) of 1.2 μm as a positive electrode active material, carbon black as a conductive agent, and PVDF, as a binder, were mixed in a weight ratio of 93:3:4 in an N-methylpyrrolidone solvent and, additionally, 1 part by weight of a HNBR dispersant (AN: 37 wt %, HBD ratio: 21%) was further mixed based on 100 parts by weight of the positive electrode active material to prepare a first mixture (solid content of 68 wt %).

Comparative Example 1

A slurry for a positive electrode was prepared in the same manner as in Example 1 except that the solid content of the first mixture was adjusted to 79 wt %, and mixing was performed while further adding an N-methylpyrrolidone solvent to the first mixture in an agglomerate state thus prepared.

Comparative Example 2

A slurry for a positive electrode was prepared in the same manner as in Example 1 except that the solid content of the first mixture was adjusted to 48 wt %, and mixing was performed on the first mixture in a liquid phase state thus prepared at 3,000 rpm for 80 minutes using a Homo mixer.

Experimental Example 1: Shear Viscosity Measurement

Shear viscosities at 23° C. of mixtures were measured during the preparation of the slurries for a positive electrode of Examples 1 and 2 and Comparative Examples 1 and 2. The shear viscosity was measured using a TA instrument rheometer (DHR2), and the shear viscosity was measured in such a manner that a concentric cylinder accessory of the DHR2 rheometer was used, 10 ml of the mixture was introduced, and the viscosity was then measured. The results thereof are presented in Table 1 below.

TABLE 1

| | Shear viscosity (Pa · s) | |
|---|---|---|
| | Shear rate $10^{-1}$/s | Shear rate 1/s |
| Example 1 | 2,572.7 | 269.3 |
| Example 2 | 2,124.6 | 211.5 |
| Comparative Example 1 | 660,523 | 42,595.2 |
| Comparative Example 2 | 78.8 | 10.9 |

Referring to Table 1, with respect to Examples 1 and 2 in which the solid content of the mixture was 68 wt %, shear viscosities at a shear rate of $10^{-1}$/s were respectively about 2,500 Pa·s and about 2,100 Pa·s, and shear viscosities at a shear rate of 1/s were respectively about 270 Pa·s and about 210 Pa·s, but, with respect to Comparative Example 1, in which the solid content of the mixture was 79 wt %, shear viscosity was very much increased and, with respect to Comparative Example 2, shear viscosity was significantly reduced. With respect to Comparative Example 1 in which the shear viscosity was significantly increased, since the mixture formed the agglomerate although the shear viscosity was very high, the effect of increasing the shear rate was difficult to be obtained in the mixing process, and thus, the dispersibility was reduced. With respect to Comparative Example 2, although the effect of increasing the shear rate may be sufficiently obtained, since the shear viscosity was very low, there was a limitation in improving the shear rate, and thus, the dispersibility may be reduced.

Experimental Example 2: Particle Size Measurement

Particle sizes of the particles in the slurries for a positive electrode prepared in Examples 1 and 2 and Comparative Examples 1 and 2 were measured using a grind gauge. The results thereof are presented in Table 2 below.

TABLE 2

| | Grind gauge maximum particle size (μm) |
|---|---|
| Example 1 | 25 |
| Example 2 | 15 |
| Comparative Example 1 | 80 |
| Comparative Example 2 | 70 |

Referring to Table 2, with respect to Examples 1 and 2 in which the slurries for a positive electrode were respectively prepared by mixing the mixtures in the paste state in which the solid content was 68 wt %, it may be confirmed that the particle sizes in the slurries were significantly reduced in comparison to those of Comparative Examples 1 and 2. With respect to Example 2 in which the mixing was performed by adding the dispersant, the particle size was further reduced in comparison to Example 1.

Experimental Example 3: Electrode Surface Observation

The positive electrode slurries prepared in Example 1 and Comparative Examples 1 and 2 were respectively coated on aluminum current collectors, dried at 130° C., and then pressed to prepare positive electrodes.

Figure 2:
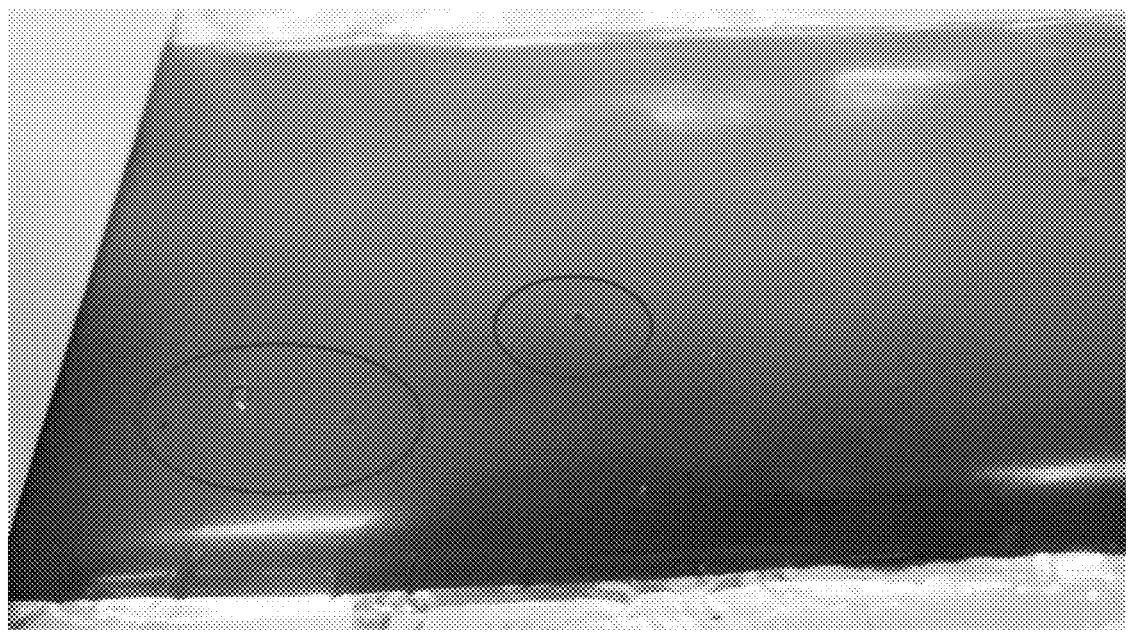
FIG. 2 is an image of a surface of a positive electrode prepared with a slurry for a positive electrode according to Comparative Example 1.
Figure 3:
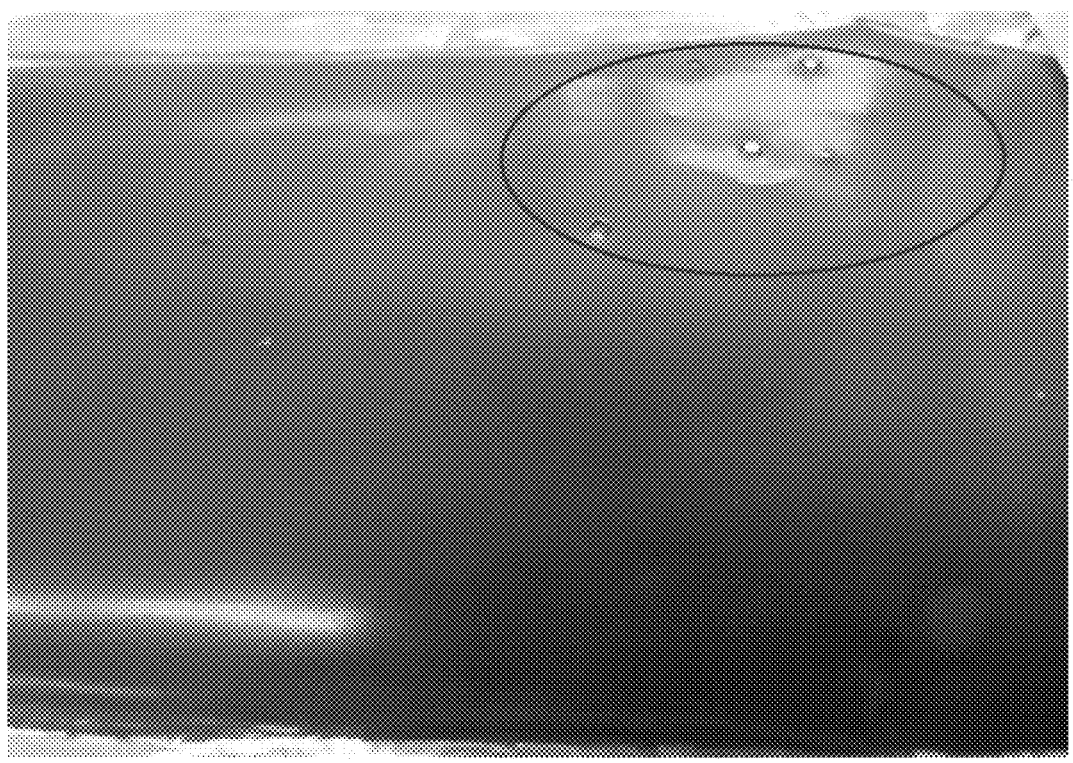
FIG. 3 is an image of a surface of a positive electrode prepared with a slurry for a positive electrode according to Comparative Example 2.

Surfaces of the positive electrodes prepared by using the positive electrode slurries prepared in Example 1 and Comparative Examples 1 and 2 were visually observed, and their images are illustrated in FIG. 1 (Example 1), FIG. 2 (Comparative Example 1), and FIG. 3 (Comparative Example 2).

Referring to FIGS. 1 to 3, with respect to Example 1, grains were not observed on the surface of the positive electrode, but, with respect to Comparative Examples 1 and 2, it may be confirmed that a plurality of grains was present on the surface of the positive electrode. It may be considered that, with respect to Example 1 in which the shear stress was efficiently transferred, since the $LiFePO_4$ positive electrode active material having an average particle diameter of less than 1 μm was well dispersed, the particle size in the slurry for a positive electrode was small and the positive electrode may be uniformly coated without the formation of grains, but, with respect to Comparative Examples 1 and 2, since the shear stress was not efficiently transferred, the $LiFePO_4$ positive electrode active material having an average particle diameter of less than 1 μm was not sufficiently dispersed and the particle size in each of the slurries for a positive electrode was increased, and thus, grains were formed on the surface of each positive electrode.

The invention claimed is:

1. A method of preparing a slurry for a secondary battery positive electrode, the method comprising:
    forming a first mixture in a paste state by adding a lithium iron phosphate-based positive electrode active material, a conductive agent, a binder, and a solvent; and
    preparing a slurry for a positive electrode by mixing while further adding a solvent to the first mixture in the paste state,
    wherein the first mixture has a shear viscosity of 1,000 Pa·s to 5,000 Pa·s at a shear rate of $10^{-1}$/s and at a temperature of 23° C, and the first mixture has a solid content of 60 wt % to 70 wt %.

2. The method of claim 1, wherein the first mixture has a shear viscosity of 100 Pa·s to 500 Pa·s at a shear rate of 1/s and at a temperature of 23° C.

3. The method of claim 1, wherein the first mixture has a shear viscosity of 2,000 Pa·s to 3,000 Pa·s at a shear rate of $10^{-1}$/s and at a temperature of 23° C., and has a shear viscosity of 200 Pa·s to 300 Pa·s at a shear rate of 1/s and at a temperature of 23° C.

4. The method of claim 1, wherein the lithium iron phosphate-based positive electrode active material is a primary particle having an average particle diameter of less than 1 μm.

5. The method of claim 1, wherein the lithium iron phosphate-based positive electrode active material is represented by Formula 1:

$$Li_{1+a}Fe_{1-x}M_xPO_{4-b}A_b \qquad \text{[Formula 1]}$$

wherein, in Formula 1, M is at least one selected from the group consisting of manganese, nickel, cobalt, copper, scandium, titanium, chromium, vanadium, and zinc, A is at least one selected from the group consisting of sulfur, selenium, fluorine, chlorine, and iodine, $-0.5<a<0.5$, $0 \le x<0.5$, and $0 \le b \le 0.1$.

6. The method of claim 1, further adding a dispersant during the formation of the first mixture.

7. The method of claim 6, wherein the dispersant comprises a hydrogenated nitrile butadiene rubber.

8. The method of claim 6, wherein the dispersant is mixed in an amount of 0.8 part by weight to 1.5 parts by weight based on 100 parts by weight of the lithium iron phosphate-based positive electrode active material.

* * * * *